United States Patent [19]

Van Eenam

[11] 4,289,864
[45] Sep. 15, 1981

[54] OXIDATIVE POLYMERIZATION OF MONOMERS HAVING AT LEAST TWO ACTIVATED UNSATURATIONS

[75] Inventor: Donald N. Van Eenam, Des Peres, Mo.

[73] Assignee: Monsanto Company, St. Louis, Mo.

[21] Appl. No.: 150,789

[22] Filed: May 19, 1980

[51] Int. Cl.$^3$ .................. C08F 4/28; C08F 16/00; C08F 18/18; C08F 22/28
[52] U.S. Cl. .................. 526/235; 8/115.6; 162/168 R; 162/169; 526/93; 526/288; 526/289; 526/303; 526/310; 526/322; 526/323; 526/326; 526/334
[58] Field of Search .............. 526/235, 323, 334, 322, 526/326, 289, 303, 310, 288; 162/168 R, 169

[56] References Cited

U.S. PATENT DOCUMENTS

| | | | |
|---|---|---|---|
| 3,766,149 | 10/1973 | Olwa et al. | 526/235 |
| 4,100,133 | 7/1978 | Emmons et al. | 260/45.9 L |
| 4,145,248 | 3/1979 | Van Eenam | 162/168 R |

FOREIGN PATENT DOCUMENTS

| | | | |
|---|---|---|---|
| 498072 | 12/1953 | Canada | 526/235 |
| 48-67379 | 9/1973 | Japan | 526/235 |
| 54-1760 | 1/1979 | Japan | 526/235 |
| 660377 | 11/1951 | United Kingdom | 526/235 |
| 2034725 | 6/1980 | United Kingdom | 526/235 |

OTHER PUBLICATIONS

Encyclopedia of Polymer Science & Tech. vol. 1 pp. 775–776.

*Primary Examiner*—John Kight, III
*Attorney, Agent, or Firm*—David Bennett; William J. Farrington; Edward P. Grattan

[57] ABSTRACT

A process is described that results in the production of a hydrophilic air-drying polymer system suitable for increasing the inter-fiber bonding in a fibrous substrate material. The process comprises passing air through a monomer maintained at a temperature below about 30° C., said monomer having at least two activated unsaturations, until a desired viscosity increase has been achieved.

10 Claims, No Drawings

OXIDATIVE POLYMERIZATION OF MONOMERS HAVING AT LEAST TWO ACTIVATED UNSATURATIONS

This invention relates to air-curing polymers that are essentially hydrophilic in character and are adapted for a range of applications such as bonding agents for fibrous materials.

Many commercial products are based on non-woven fibrous materials that of themselves have no great coherency. That is to say the products have low inherent strength and can easily be pulled apart, especially when wet. It is conventional to apply to such products a bonding agent that, by one mechanism or another, makes the fiber structure more difficult to disrupt.

The present invention provides a low-cost, highly efficient polymer that is capable of enhancing the strength of a fibrous substrate treated therewith and is particularly effective on cellulosic substrates.

DISCUSSION OF THE PRIOR ART

Cellulosic substrates are commonly strengthened by the use of thermosetting wet-strength resins such as one made by the reaction of a polymer containing a plurality of amine groups with epichlorohydrin, or an aminoplast/formaldehyde-based resin. These often lead to a harsh "handle." Further it is known that in some cases either the monomers themselves, other reactants or certain by-products require special treatment that increases the expense of the process by which they are made.

One type of additive that is environmentally more attractive while remaining highly efficient are the air-curing polymers described in U.S. Pat. No. 4,145,248. These polymers, which henceforth are styled polyetherenes to distinguish them from the polymer systems of the present invention, are characterized by blocks of at least four adjacent unsaturations activated, usually by ether group though this is not essential, which upon exposure to air, undergo cross-linking reactions to generate a cured system. The cross-linking is in fact oxygen-induced but the convention, followed here, is to call such compounds air-curing. It is disclosed that the viscosities of these polymers can be increased by bubbling air through polymer optionally in the presence of a metal salt drier such as a soluble cobalt salt.

It has now been found that air-curing systems can also be developed from similar molecules by a process that is extremely cheap and easy to operate. This process, which may be characterized as an "oxidative polymerization," holds the promise of relatively cheap but highly effective polymer systems for use, for example, in improving the inter-fiber bonding of a fibrous substrate. The system is highly flexible insofar as polymer structure/property control is concerned.

DESCRIPTION OF THE INVENTION

The present invention provides a process for the production of a hydrophilic polymer system which comprises passing oxygen through a monomer maintained at a temperature of 30° C. or below, said monomer having a structure comprising at least two unsaturations, with no more than three of said unsaturations being $\alpha, \beta$ or $\beta, \gamma$ to a nucleophilic group capable of activating the unsaturation towards oxidative polymerization and selected from the group consisting of —O—, —S—, —CON<, —COO—, >C=C<, —SO.OH<, —SO.O—, and >NCN, so as to polymerize the monomer oxidatively and raise the viscosity of the system to a desired level.

The reactant employed is a monomer in contradistinction to the polyetherenes of U.S. Pat. No. 4,145,248. The term is not however, intended to exclude low molecular weight compounds that could be viewed as dimers or even oligomers, providing they lack the blocks of at least four activated unsaturations that characterize polyetherenes.

The process of oxidation polymerization as the term is used in relation to the present invention comprises the formation of chemical intermediates from the monomer and oxygen that they heterolytically and/or homolytically cleave and whose fragments then undergo irreversible addition reactions.

A suitable measure of the hydrophilic character of the polymer is its "water wicking time" and this may be determined by applying the polymer in the form of an aqueous solution or dispersion to Whatman #1 filter paper at a 10 percent weight/weight ratio, drying the paper at 120° C. for 10 minutes in a circulating air oven and then dropping onto the center of the horizontally positioned paper, a 0.10 ml. drop of water at 22° C. and measuring the time for the drop to disappear. The end point is determined by the disappearance of the gloss indicating that no water film remains on the surface. The speed with which this occurs is a function of the speed with which the water is dissipated through the paper fibers by the wicking effect and thus in turn is controlled by the hydrophilicity of the fibers. If therefore a cellulosic paper substrate (which is naturally very hydrophilic) is treated with a hydrophobic composition, the water will tend initially to "bead" rather than be absorbed and spread through the paper; and consequently the "water wicking time" will be high. Thus, the water wicking time is a very effective technique for assessing the hydrophilicity of a composition by a practical and easily performed test. Generally a water wicking time of 30 seconds or less is indicative of hydrophilic character. Even shorter wicking times are preferred.

In most cases the hydrophilic character of a monomer and/or its oxidative polymerizate can be predicted on the basis of the ratio of carbon atoms to hetero-atoms in the activating group. Usually for O, or N as the hetero-atom, a ratio of 5:1 or less is indicative of hydrophilic character. Where the hetero-atom is sulfur, a ratio of 4:1 or less usually implies hydrophilic character.

The monomer used comprises at least two activated unsaturations. As indicated above, each unsaturation is activated towards oxidative polymerization by a group that is generally nucleophilic in nature and therefore strongly electron-donating. The activating group is usually the residue of an active hydrogen-containing moiety with an active hydrogen removed to allow bonding to the group containing the unsaturation.

The group containing the activated unsaturation is usually a substituted or unsubstituted vinyl, or more preferably an allyl radical. It can, however, be a homolog of such groups. It is often useful to have the unsaturation that is $\alpha, \beta$ or $\beta, \gamma$ to the activating group conjugated with another unsaturated group in the same chain. It should be recalled, however, that as the length of a hydrocarbon chain increases, the hydrophilicity of the overall monomer decreases.

Typical unsaturated groups include, for example: —CH$_2$CH=CH$_2$, —CH=CH$_2$, —C(CH$_3$)=CH$_2$, —CH$_2$—CH=CH—CH$_3$ ("cis" and "trans" versions), —CH$_2$—CH=C<, —CH$_2$C(CH$_3$)=CH$_2$, and —CH(CH$_3$)CH=CH$_2$. Since the monomer comprises at least two or three such groups it is convenient to refer to them as di/tri olefinic monomers.

Preferred among the activating groups described above are —COO—, —O—, —S—, —CON<, >N.CN or an unsaturated group in which the unsaturated bond is conjugated with the activated unsaturation. Of course the same group can be used to "activate" several unsaturated bonds as for example in diallyl ether. The most effective activating groups are the ones that are most strongly electron donating (nucleophilic) such that the affected carbon-to-carbon unsaturations are most intensely "activated" toward air-curing chemistry.

No more than three of the activated unsaturation-containing groups may be adjacent to one another, that is to say, pendant from carbon atoms in a common backbone molecule which atoms are directly linked or separated by one or two other carbon atoms, an oxymethylene group or an oxygen or sulfur atom.

The molecule need not contain only the groups and moieties indicated. Other non-interfering functional or nonfunctional groups such as ester, amide, nitrile, carboxylic acid, ketone, carboxyaldehyde, sulfonamide, and the like can be present in the molecule. Indeed, sometimes functional groups can be very significant in providing a monomer that will result in a polymer with an appropriate degree of hydrophilicity, polarity, and substativity.

Very often, however, the preferred molecules are as simple as possible since these tend also to be relatively cheap. An excellent monomer starting material is 1,2 diallyl oxy-ethane. Other possible monomers include 1,4-diallyloxy-2-butene, 1,3-diallyloxy-2-propanol, diallyl sulfide, β-vinyloxy ethyl allyl ether, diallyl succinate, diallyl maleate, diallyl fumarate, triallyl cyanurate, triallyl isocyanurate, triallyl orthoformate, dimethallyl malonate and bis (β-vinyloxyethyl)ether.

A useful predictive tool for determining which unsaturated monomers are capable of undergoing oxidative polymerization is the monomer's "Q value" as described by Alfrey and Price in J. Polymer Science, Vol. 2, p. 101, (1947). Q represents the reactivity of the monomer and the lower the Q value, the more readily will the monomer undergo oxidative polymerization. In general monomers suitable for oxidative polymerization by the process of the invention have Q values below 0.3 and preferably below 0.1. Examples of suitable monomers with their corresponding Q values are (o-, m- or p-) diallyl phthalate, 0.044; dimethallyl oxalate, 0.038; and triallyl-isocyanurate, 0.011.

The process of the invention is formed at temperatures of 30° C. or lower and preferably at from 10° C. to 25° C. and can involve the monomer alone, (which will conventionally be a liquid under normal conditions) or a solution or emulsion of the monomer in a solvent.

The temperature of the reaction is found to be critical in that low temperatures are required if reactive peroxy and hydroperoxy sites that are applicable to air-curing chemistry are to be obtained and accumulated in adequate numbers. It is surprisingly found, for example, that reaction at a high temperature (above 30° C. and typically at 60°–70° C. or even higher) produces a polymer that, when applied to paper, generates good dry strength but poor wet strength, indicating inadequate cross-linking of the polymer on air-curing. By contrast, the wet strength generated by polymers produced by the process of the invention is very substantially better, indicating that a much higher degree of cross-linking has been achieved.

The time during which the oxygen is passed through the monomer depends largely on the rate at which oxygen is absorbed, that is, in effect, gas depression effectiveness, monomer reactivity, and the viscosity of the desired final product produced in an "oxidative polymerization." Often the time can be shortened by the presence of monomer/polymer-soluble metallic drier salts such as cobalt acetate, cobalt octoate, manganese acetate, and other salts or soluble complexes of transition metals that are known generically as "metallic driers" in the paint field. Organic peroxides such as benzoyl peroxide and similar hydroperoxides are also found to be effective either alone or in conjunction with tertiary amines or with the metallic driers described above. Generally, from 0.001 to 5.0 percent by weight of such an additive or additive combination based on the monomer weight is found to be effective.

The oxygen can be supplied either as a pure gas or as a mixture with other inert gases such as, for example, air. In general, air is preferred even though the reaction may be longer than when a gas with a higher oxygen content is used. The oxygen partial pressure may be widely varied but in practice atmospheric pressure is usually found to be convenient. Conditions which favor oxygen dissolution such as sparging, agitation, stirring, dispersing, counter current mixing and the like will also speed oxidative polymerization.

The passage of oxygen is continued until, as a result of the oxidative polymerization, the desired "built" viscosity is reached. This viscosity may be, for example, a Gardner viscosity at 25° C. of from A/B to Z-4 or a Brookfield viscosity of from 125 to 15,000 cps. A viscosity in this range may be reached in a matter of hours, days, or even weeks depending primarily on the reactivity of the monomers, the number of activated saturations in the molecule, the presence/absence of solvent, the reaction temperature, the presence/absence of metallic driers or other catalysts and the partial pressure of the oxygen in the reaction mixture.

It should be noted that the free-radical reaction conditions chosen are those which unmistakably lead to oxidative polymerization of the metallic drier-promoted, air-curing alkyd resin type, not that of vinyl (addition) polymerization-typified by the styryl, acrylic/methacrylic, vinyl, etc. systems. The latter, as is known to those skilled in the art, occurs only in the presence of free radical-producing additives (i.e. initiators) and near total absence of radical inhibitors—including, among others, free dissolved oxygen, hydroquinones, and their derivatives, homologs, etc., phenols, mercaptans, quinones, and (poly) primary or secondary amines. Since the reaction systems of the invention are continually sparged with air (O$_2$), the initial oxygen rich phase assures that the reaction will overwhelmingly be of the oxidative polymerization type.

One of the many useful and practical reaction techniques available for accelerating overall polymerization rates of the less reactive of this class is the simple addition/incorporation of low levels (often <20 W/W%) of one or more of the air-curing polyetherenes described in U.S. Pat. No. 4,145,248 and particularly those that have been air-built or "bodied" to a viscosity of about 3,000 to 15,000 cps. Such an addition can dramatically decrease the air (O$_2$) viscosity building time required. Thus, the polyether-ene apparently functions as a (per)

oxidative reagent assisting the transfer of highly reactive —O—O., H—O—O., >CHO., or related radical intermediates to the di/tri olefinic monomer or their growing polymers until the desired resin viscosity is achieved. Polyether-enes and their air "bodied" derivatives may boost polymerization rates of most olefinic monomers by a factor of as much as 5–10 fold. Yet, surprisingly, no separate gel-phase, air-resinified polyetherene forms during the air-building of various di/tri olefinic monomers of differing structural types. Presumably, then, the product obtained is a mixture of homo- and copolymers containing (hydro)peroxy and olefinic groups.

The polyether-enes comprises a plurality of unsaturations pendant from a backbone molecule and activated usually but not essentially, by an ether group with the unsaturations $\alpha$, $\beta$ or $\beta$, $\gamma$ to the activating group. While up to 50% of a polyether-ene or its air "bodied" derivative can be used, it is often desirable to employ a much smaller amount, for example, from 5 to 30% and especially about 10 to 25% by weight.

While air-bodied polyether-enes are the preferred oxidative polymerization rate promotors, other types of additives have also shown useful rate accelerating characteristics. Among these are the products obtained by the process of this invention.

The polymer system can be formulated with other additives to provide a variety of characteristics and desired properties. Thus, for application to paper, a dry strength additive, a retention aid or a surfactant and such like additives can be added with the polymer system of the invention.

While not wishing to be bound by theory, it appears that the unsaturated groups and oxygen generate hydroperoxy, peroxy, or other free radical-generating groups which react with said unsaturated groups to form either direct carbon-to-carbon intermolecular bonds or else oxy- or peroxy bridges between molecules. These soluble "prepolymer" intermediates readily thermoset or crosslink (i.e. air-cure) in the presence of a substrate. It is this process of cross-linking or thermosetting of the oxidative polymerizates in the presence of a substrate that imparts permanent properties to the substrate. Such properties can include for example, wet/dry strength for cellulosic substrates and permanent crease or press properties when applied to textile fabrics. It is highly preferred that the building of the molecular weight of these intermediates be controlled such that the in vitro reaction is essentially stopped while the polymer is still soluble or readily dispersible in water or other hydrophilic solvent. If this is done, the polymer that results can be stored and, ultimately, applied to a fibrous or other modifiable substrate in the very convenient form of a solution or perhaps emulsion.

DESCRIPTION OF THE PREFERRED EMBODIMENTS

The invention is further illustrated with reference to the following Examples which are not to be understood as implying any limitation on the essential scope of the invention.

EXAMPLE 1

This example describes the production and testing of a polymer according to the invention.

Into 3.00 g (0.021 mole) of 1,2-di(allyloxy)-ethane and 0.0167 g. (1 drop) of 12% cobalt octoate (in cyclohexane) contained in a two dram vial was slowly bubbled a stream of compressed air. Ambient temperature was maintained in the solution and an uninterrupted flow was continued for 20.5 hours.

Over the last 2-3 hours the viscosity began to increase noticeably. The reaction was shortstopped by dilution with methanol and stopping the air flow. Before shortstopping the product was a clear, very viscous liquid.

A portion of the reaction product above, weighing 0.22 g. was diluted to 1.1 g. with a 3:1 methanol/water mixture containing 1 drop of 1.0% cobalt acetate tetrahydrate. The resulting clear, pale green-orange solution was carefully poured onto a 12.5 cm. Whatman #1 filter paper circle which was then dried/cured for 10 min. at 120° C. in a circulating air oven. This treatment was equivalent to an application of 200 kilograms per metric ton of the paper substrate.

The filter paper was then cut in the machine direction into 2.54 cm strips and tested for wet strength and dry strength on an Instron tensile tester. The dry strength test was performed on samples prepared as above. The wet strength test was performed on samples that had received an additional 5 minutes soaking in a 1.0% aqueous solution of a sodium ($C_{11}$–$C_{12}$) alkyl benzene sulfonate followed by a water rinse and a light drying using a blotter.

The wet strength of the sample was 16.9 pounds/inch and the dry strength was 35.7 pounds/inch. Untreated paper, for the purposes of comparison has wet and dry strengths of 0.37 and 11.8 pounds/inch respectively.

The water wicking time of the polymer as measured by the time taken for a 0.10 ml drop of water, placed on the treated filter paper to be completely absorbed, (shown by a disappearance of the gloss on the surface of the paper), is about 5 seconds. This indicates that the polymer has a high degree of hydrophilicity.

EXAMPLE 2

This Example describes the effect of air building a polymer according to the invention in the presence of an air-curing polymer of the type described in U.S. Pat. No. 4,145,248. For clarity this polymer will be styled a "polyether-ene."

A polyether-ene was prepared by the reaction at 70° C., of ethylene glycol with allyl glycidyl ether in a mole ratio of about 1:10 and in the presence of a boron trifluoride catalyst. After completion of the reaction the catalyst residue was removed using soda ash and the polyether-ene was separated as a liquid with a Gardner viscosity of F at 25° C.

Air was bubbled through the polyether-ene for 72 hours at 50° C. after which it was allowed to stay at room temperature for a further 48 hours. A slow air stream was re-commenced and continued at room temperature for another 12 days after which the Gardner viscosity had increased to Z-3 (about 4600 cps) of 25° C. A mixture of 5 grams of this air-bodied polyether-ene and 20 grams of di-allyl maleate was placed in a flask equipped with a magnetic bar stirrer. Cobalt acetyl acetonate (0.05 g) was dissolved in the reactant mix and a slow/moderate steady stream of air was passed through the light green solution. The stirring was maintained throughout the reaction and the temperature was kept at 25° C.

The initial viscosity of the mixture was about 14–15 cps and after eight hours this had risen to only about 22 cps. After 15 hours the viscosity had increased to about 300 cps but the solution maintained its clear green color.

After 21 hours the mixture was found to have cured to a hard, clear, pale-yellow, thermoset mass containing trapped air bubbles. The mass was essentially free of any characteristic ester monomer odor and was tough and brittle.

The fact that no separate gel-phase was evident in the final polymer is an indication that a co-polymerization has occurred. Moreover the use of the polyether-ene greatly accelerated the formation of the fully cured polymer.

EXAMPLE 3

This is a repeat of Example 2 except that the reaction is stopped before resinification and the product tested for wet strength generation.

The procedure of Example 2 was followed except that, after 18 hours reaction time, when the viscosity had reached about 5,000 cps, the reaction was terminated. A Waring blender was then used to form an emulsion of 12.5 g of the above reaction product, 0.20 g of an anionic surfactant (sodium alkyl benzene sulfonate as a 40% actives aqueous slurry), 0.40 g of Triton X-305 (a nonionic surfactant available under that trade designation from Rohm and Haas Co.), 0.50 g of a 5% aqueous solution of cobalt acetate tetrahydrate and 36.4 g of deionized water.

The resulting emulsion was a bluish, milky-white, stable, low-foaming, fluid (about 17 cps), colloidal suspension that showed no settling after 5 days.

The emulsion was applied to Whatman #1 filter paper (200 kg/metric ton application level) and tested for wet and dry strength and water wicking time in the manner described in Example 1.

For comparison the dry and wet strengths and water wicking time generated by the (non-air "built") polyether-ene used alone and at the same application level was also measured. The results are set forth in Table 1.

TABLE 1

|  | Wet Tensile Strength gm/cm. | Dry Tensile Strength gm/cm. | Water Wicking Time (sec.) |
|---|---|---|---|
| Example 3 Product | 3286 | 6608 | 8 |
| Air curing polymer alone | 3376 | 6626 | 4 |
| Untreated paper | 62.5 | 2090 | 1+ |

The above data clearly show that addition of a minor amount of polyether-ene to the process of the invention leads to the formation of a product giving excellent wet and dry strength and good hydrophilic character. This reaction occurs somewhat faster than in the absence of polyether-ene and, since the polyether-ene is the more expensive component, the substantial equivalence of the tensile strengths obtained suggests an economical method of using such polyether-enes.

EXAMPLE 4

This Example demonstrates the process of the invention applied to a number of different monomers. In each case air was bubbled through the liquid monomer at room temperature and the total time for the monomer to gel and/or to cross-link to a hard casting was noted. The results are set out on Table 2 below.

TABLE 2

| Monomer | Catalyst | Polyether-ene(1) (Wt ratio to monomer) | Time to Gel |
|---|---|---|---|
| 1. Allyl Sorbate | A | — | 11 days |
| 2. Allyl Sorbate | A | 1:4 | 41 hours (soft) |
| 3. Allyl Crotonate | A | — | 6.5 days (hard) |
| 4. Allyl Methacrylate | A | — | 12.25 days |
| 5. Diallyl Adipate | B | — | 13.5 days |
| 6. Diallyl Adipate | A | 1:3 | 18 hrs. (mod. soft) |
| 7. Diallyl Cyanamide | A | — | 135 hrs. |
| 8. Diallyl Fumarate | A | — | 14 days |
| 9. Diallyl Fumarate | A | 1:4(2) | 113.5 hrs. (Hard at 120 hrs.) |
| 10. Diallyl Fumarate | A | 1:4 | 40 hrs. |
| 11. Diallyl Maleate | A | — | 65 hrs. |
| 12. Diallyl Maleate | A | 1:4(2) | 2 days (Hard) |
| 13. Diallyl Maleate | A | 1:3 | 22 hrs. (Hard) |
| 14. Diallyl Malonate | A | 1:3 | 21.5 hrs. (30 hrs. Hard) |
| 15. 1,4-Diallyloxy-2-butene | A | — | (Gard vis. at 24 hrs. -Z-5) |
| 16. 1,2-Diallyloxy ethane | B | — | (Non-gelled V. viscous at 20.5 hrs.) |
| 17. Diallyl (o,m,p-) phthalate | A | — | 68.5 hrs. |
| 18. Diallyl succinate | A | — | 6.0 days (Hard) |
| 19. Diallyl succinate | A | 1:4 | 14 hrs. (15–16 hrs.-Hard) |
| 20. Diallyl sulfide | A | 1:4 | (Gard. visc. at 96 hrs. -Z-3) |
| 21. 1,4-Di(vinyloxy)butane | A | — | 71 hrs. |
| 22. Triallyl orthoformate | A | — | 136 hrs. |
| 23. Triallyl isocyanurate | A | 1:4 | 10–12 hrs. (16 hrs.-Hard) |
| 24. Trimethylol propane diallyl ether | none | — | 69 hrs. (Reaction at 70° C.) |
| 25. Vinyl allyl ether | A | 1:4 | 4 days |

NOTES
(1)the air "bodied" polyether-ene described in Example 2.
(2)the polyether-ene of Example 2 without the air bodying treatment.
Catalyst A is cobaltic acetyl acetonate
Catalyst B is cobaltous octoate.

The polymers from certain of the runs described in Table 2 were tested for wet and dry strength at a stage before gelation had begun. In each case the air-built polymer was dissolved a 3:1 methanol/water mixture and a trace of a soluble cobalt salt (5% aqueous cobalt acetate) was added.

The solution was applied to a 12.5 cm Whatman #1 filter paper circle using a microsyringe in a predetermined amount in order to give the desired loading of 200 kg/metric ton. The treated paper was dried/cured for 10 minutes in a circulating air oven at 120° C.

Strips 2.54 cm in width were cut in the machine direction and these were tested in an Instron tensile tester. Samples to be assessed for wet strength were first given a ten minute soak in 1.0% aqueous Triton X-100 before being water rinsed and lightly blotted.

The results are set forth in Table 3.

TABLE 3

| Run No. | Stopped after hrs. | Wet Strength (W) (gm/cm.) | Dry Strength (D) (gm/cm.) | Ratio W/O |
|---------|--------------------|-----|-----|------|
| 9  | 108  | 3072 | 6850 | .448 |
| 10 | 37   | 3518 | 7073 | .497 |
| 13 | 21   | 3822 | 7805 | .490 |
| 15 | 24   | 3233 | 7019 | .461 |
| 16 | 20.5 | 3018 | 6376 | .473 |
| 18 | 72   | 4090 | 7823 | .523 |
| 20 | 96   | 2733 | 6162 | .443 |
| 21 | 70   | 2983 | 5912 | .505 |
| 24(1) | 68.5 | 2554 | 8519 | .300 |
| Control | — | 62.5 | 2090 | .03 |

(1)Reaction was at 70° and no catalyst was used.

As can readily be seen from run 24 the high temperature and the absence of a catalyst severely affected the wet strength while improving the dry strength indicating a different kind of reaction was occurring that probably involves a much lower degree of cross-linking. The presence of water appears to reduce the cohesiveness of the treated substrate very substantially.

EXAMPLE 5

This Example illustrates the critical temperature dependence of the process of the invention. The same basic process was run at three different temperatures and the resulting polymers were applied to paper substrates and tested for wet and dry strength in the manner described in Example 4. The ratio of wet to dry strength was plotted on a graph against temperature of reaction. The results show clearly that at high temperatures the air-curing chemistry which leads to high wet strength as a result of extensive cross-linking is not favored. It is believed that this is because at such temperatures, sites through which air-curing cross linking can occur are either destroyed or not formed.

Run A (at 23° C.)

A solution of 0.008 gram of cobalt acetylacetonate in 4.0 grams of trimethylolpropane diallyl ether was placed in a 2 dram vial and sparged with a fine stream of air. Over a period of 42.0 hours the Brookfield viscosity increased from 10 cps to 5340 cps. The resin obtained was applied to a paper substrate at a 200 kg/metric ton application level and tested for wet and dry strength as described above. The average wet/dry strength ratio was 0.496.

Run B (at 46°–47° C.)

The same solution as in Run A when treated in the same way increased in Brookfield viscosity over a 56 hour reaction period from 10 cps to 6400 cps. The wet/dry strength ratio was determined in the same fashion and was found to be 0.380.

Run C (at 70° C.)

This is a repeat of Run 24 from Example 4. The same solution was used except that the cobalt salt was omitted. The Brookfield viscosity increased from 10 cps to 6340 cps over a reaction time of 68.5 hours. When tested for wet and dry strength the ratio was found to be only 0.300.

From the above it can be seen that the use of a lower reaction temperature clearly favors a type of reaction that leads on curing to a three-dimensional cross-linked resin that can better withstand the swelling and solubilizing effects of water and thus produce enhanced wet strength.

EXAMPLE 6

This Example illustrates the effect demonstrated in Example 5 in a somewhat different fashion with reference to the polymer itself.

Run A

A solution of 4.0 parts of diallyl phthalate and 1.0 part of the air-bodied polyether-ene described in Example 2 was sparged using a fine stream of air at 100° C. for 14.5 hours.

The product obtained was a colorless, soft/spongy gel that swelled rapidly in methanol, acetone and methyl ethyl ketone and failed to harden after one week at room temperature.

From these properties it was concluded that the product had a very low capacity for generating cross links by the air-curing mechanism.

Run B

The same solution as was used in Run A with the addition of a trace of cobalt acetylacetonate, was sparged with air at room temperature for a period of 23 hours. The pregel product was a pale green liquid that yielded a clear tough casting after 24 hours at room temperature. The hardness (judged according to ASTM Method D 3363-74) of the film after 24 hours was about HB and after 48 hours the hardness was about 4H. The product swelled slowly in methanol, acetone and methyl ethyl ketone.

The conclusion drawn from these properties was that the product had a high capacity for forming cross-links on exposure to air to yield a very tough product.

The above Examples are for the sake of illustration only and are not intended to imply any limitation on the scope of the invention. It is foreseen that many minor variations and modifications could be made without departing from the essence of the invention. It is intended that all such modifications and variations be embraced within the purview of this invention.

What is claimed is:

1. A process for the production of a hydrophilic air-curing polymer system which comprises passing oxygen through a monomer maintained at a temperature below 30° C., said monomer having a structure comprising at least two unsaturations, with no more than three of said unsaturations being adjacent in the molecule, at least one of said unsaturations being $\alpha$, $\beta$ or $\beta$, $\gamma$ to a nucleophilic group capable of activating the unsaturation towards oxidative polymerization and selected from the group consisting of —O—, —S—, —CON<, —COO— >C=C<, —SO$_2$N<, —SO$_2$— and >NCN, so as to polymerize the monomer oxidatively and raise the viscosity of the system to a desired level.

2. A process according to claim 1 in which the unsaturations in the monomer are selected from the group consisting of substituted and unsubstituted vinyl and allyl groups.

3. A process according to claim 1 in which the reaction takes place in the presence of a soluble metallic drier.

4. A process according to claim 1 in which the reaction takes place in the presence of up to 50% by weight of a polyether-ene.

5. A process according to claim 1 in which the reaction takes place in the presence of up to 50% by weight of an air-bodied polyether-ene.

6. A process according to claim 1 in which the monomer comprises from 2 to 3 allyloxy groups.

7. A process according to claim 1 in which the monomer is a liquid and is treated with air at ambient temperatures and pressures.

8. A process according to any of claims 1 to 7 in which the monomer is selected from the group consisting of 1,2-di-(allyloxy) ethane and diallyl maleate.

9. A polymer system prepared by a process according to any of claims 1 to 7.

10. A substrate treated with a polymer system according to claim 9.

* * * * *